United States Patent
Bekas et al.

(10) Patent No.: US 10,360,703 B2
(45) Date of Patent: Jul. 23, 2019

(54) AUTOMATIC DATA EXTRACTION FROM A DIGITAL IMAGE

(71) Applicant: International Business Machines Corporation, Armonk, NY (US)

(72) Inventors: Konstantinos Bekas, Horgen (CH); Gabriel Cuendet, Fribourg (CH); Maria Gabrani, Thalwil (CH); Peter W. J. Staar, Wädenswil (CH)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 15/405,769

(22) Filed: Jan. 13, 2017

(65) Prior Publication Data

US 2018/0204360 A1    Jul. 19, 2018

(51) Int. Cl.
*G06K 9/34* (2006.01)
*G06T 11/20* (2006.01)
(Continued)

(52) U.S. Cl.
CPC ........ *G06T 11/206* (2013.01); *G06K 9/00469* (2013.01); *G06K 9/6277* (2013.01); *G06K 9/6297* (2013.01)

(58) Field of Classification Search
CPC ............. G06T 11/206; G06T 11/60; G06T 2207/20104; G06T 7/162; G06T 7/187; G06K 2209/01; G06K 9/3233
See application file for complete search history.

(56) References Cited

U.S. PATENT DOCUMENTS

| | | | |
|---|---|---|---|
| 8,799,772 B2 | 8/2014 | Megiddo et al. | |
| 8,847,947 B2 * | 9/2014 | Gong | G06T 19/00 345/419 |

(Continued)

OTHER PUBLICATIONS

Lu et al.; "Automatic extraction of data from 2-D plots in documents"; Ninth international conference on document analysis and recognition (ICDAR 2007), Sep. 23-26, 2007; Parana Brazil. (Year: 2007).*

(Continued)

*Primary Examiner* — Euengnan Yeh
(74) *Attorney, Agent, or Firm* — Daniel P. Morris, Esq.; Hoffmann & Baron, LLP

(57) ABSTRACT

The invention relates to a computer-implemented method for automatically extracting data from a digital image comprising a graphical representation of quantitative data. The method comprises: Basic graphical objects are detected and structural primitives determined comprising grouping the basic graphical objects based on geometric relations. A semantic label is assigned to each of the structural primitives. A spatial data region of the graphical representation is determined using the semantic labels of the structural primitives. Quantitative data values are extracted which are represented by structural primitives within the data region which are assigned with first semantic labels identifying the respective structural primitives to represent quantitative data. The extracted quantitative data values are provided in units of pixels according to an image coordinate system. The extracted quantitative data values are transformed from the image coordinate system to a coordinate system of physical units of the quantitative data represented by the graphical representation.

25 Claims, 6 Drawing Sheets

(51) Int. Cl.
*G06K 9/00* (2006.01)
*G06K 9/62* (2006.01)

(56) References Cited

U.S. PATENT DOCUMENTS

2009/0157630 A1 6/2009 Yuan
2010/0299332 A1 11/2010 Dassas et al.
2013/0286021 A1 10/2013 Mokri et al.

OTHER PUBLICATIONS

Mishchenko et al.; "Chart image understanding and numerical data extraction"; 2011 sixth international conference on digital information management; Sep. 26-28, 2011; Melbourn, Australia. pp. 115-120. (Year: 2011).*
Ales Mishchenko, et al., "Model-Based Recognition and Extraction of Information from Chart Images," Journal of Multimedia Processing and Technologies, vol. 2, No. 2, Jun. 2011, pp. 76-89.
Dorothea Blostein, et al., "Treatment of Diagrams in Document Image Analysis," 2000 Proceedings of the First International Conference on Theory and Application of Diagrams, vol. 1889, Jan. 2003, pp. 330-344.
Allan Hanbury, et al., "Patent Image Retrieval: A Survey," PaIR '11 Proceedings of the 4th workshop on Patent information retrieval, Jan. 2011, pp. 3-8 (Abstract).
Yao et al., "LineLens: Automatic Data Extraction from Line Charts", pp. 1-10. (Year: 2013), (published before this application Jan. 2017).

* cited by examiner

AUTOMATIC DATA EXTRACTION FROM A DIGITAL IMAGE

BACKGROUND

The present disclosure relates to the field of digital image analysis, and more particularly to automatically extracting data from a digital image providing a graphical representation of quantitative data.

Graphical representations such as e.g. line graphs and scatter plots are commonly used in academic, scientific, financial, patent and other analytical documents in order to graphically represent quantitative data. As examples, the results of scientific experiments, mechanical processes or performance of businesses may be summarized using such graphical representations. Documents, printed as well as digital ones, generally provide the underlying quantitative data only in form of the respective graphical representation for illustrative purposes, but not in other data formats like tables etc. Extracting the underlying quantitative data directly from a graphical representation may thus provide access to knowledge otherwise inaccessible and be of high importance for enabling a quantitative analysis of the underlying data.

Such graphical data representations being available only as digital images, like e.g. bitmap images, may comprise a broad variety of elements including lines, markers and text which are used in order to represent and characterize quantitative data. Since those elements are rastered, specific image analysis techniques may be required in order to identify these elements and extract the informational content represented by them. In order to e.g. run statistical analysis, identify trends, forecast future behaviors, simulate models or compare own data, e.g. experimental results, with data published in a document, engineers, researchers, scientists, financial analysts and other users may need access to quantitative data provided by such graphical representations in a form that allows a computer to process them.

Semi-automatic methods for extracting quantitative data are known, but do not scale when data need to be extracted from large numbers of documents provided for example by large digital libraries.

A. Baucom and C. Echanique, "ScatterScanner: Data Extraction and Chart Restyling of Scatterplots," in Conference on Human Factors in Computing Systems (CHI '13), 2013, pp. 1-8, describe a method for interactively redesign scatter plots in order to adjust their design. In view of the significant variability in the possible types of plots and their design, several assumptions are made in order to reduce the degree in complexity to be handled. The method is thus limited to clean scatter plots, without gridlines or text annotations, containing only one data series represented with simple shape markers and plotted in the first quadrant of the Cartesian plane.

S. R. Choudhury and C. L. Giles, "An Architecture for Information Extraction from Figures in Digital Libraries," in WWW '15 Companion Proceedings of the 24th International Conference on World Wide Web, 2015, pp. 667-672, describe a method for information extraction from figures in digital libraries. The method comprises semi-automatic numerical data extraction from figures. The data extraction is not performed automatically, since the user needs to indicate the beginning and ending points of x- and y-axis by recording mouse clicks and axis scales. Then, curves plotted in different colors are extracted, but binary or grayscale curves pose greater challenges and require user's input.

Thus, known methods are unable to sufficiently handle a digital image comprising an arbitrary graphical representation of quantitative data, possibly comprising e.g. a grid, a legend or text annotations. Existing methods make very restrictive assumptions regarding the structure of the data representation such as the absence of a grid or any other element that is not representing quantitative data. A second limitation of known methods may lie in the fact that no real quantitative data in original data coordinates may be extracted, but only graphical pattern resembling the original graphical representation. Thus, there is a need for an efficient and flexible method for automatically extracting data from a digital image providing a graphical representation of quantitative data

SUMMARY

Various embodiments provide a computer-implemented method for automatically extracting data from a digital image providing a graphical representation of quantitative data, a computer program product and a computer system as described by the subject matter of the independent claims. Advantageous embodiments are described in the dependent claims. Embodiments of the present invention can be freely combined with each other if they are not mutually exclusive.

In one aspect, the invention relates to a computer-implemented method for automatically extracting data from a digital image comprising a graphical representation of quantitative data. The method comprises: First basic graphical objects forming the graphical representation are detected. First structural primitives of the graphical representation are determined. The determining of the first structural primitives comprises grouping the first basic graphical objects based on geometric relations between the first basic graphical objects. A first semantic label is assigned to each of the first structural primitives. A spatial data region of the graphical representation is determined using the first semantic labels of the first structural primitives. Quantitative data values are extracted which are represented by first structural primitives within the data region that are assigned with first semantic labels identifying the respective first structural primitives to represent quantitative data. The extracted quantitative data values are provided in units of pixels according to an image coordinate system. The extracted quantitative data values are transformed from the image coordinate system to a coordinate system of physical units of the quantitative data represented by the graphical representation.

In a further aspect, the invention relates to a computer program product comprising a computer-readable storage medium having computer-readable program code embodied therewith for automatically extracting data from a digital image providing a graphical representation of quantitative data. The computer-readable program code is configured to implement a method which comprises: First basic graphical objects forming the graphical representation are detected. First structural primitives of the graphical representation are determined. The determining of the first structural primitives comprises grouping the first basic graphical objects based on geometric relations between the first basic graphical objects. A first semantic label is assigned to each of the first structural primitives. A spatial data region of the graphical representation is determined using the first semantic labels of the first structural primitives. Quantitative data values are extracted which are represented by first structural primitives within the data region that are assigned with first semantic labels identifying the respective first structural primitives to represent quantitative data. The extracted quantitative data values are provided in units of pixels according to an image coordinate system. The extracted quantitative data values are transformed from the image coordinate system to a coordinate system of physical units of the quantitative data represented by the graphical representation.

In a further aspect, the invention relates to computer system for automatically extracting data from a digital image providing a graphical representation of quantitative data. The computer system comprises a processor and a storage medium. The storage medium comprises program instructions being executable by the processor. An execution of the program instructions by the processor causes the computer system to perform a method which comprises: First basic graphical objects forming the graphical representation are detected. First structural primitives of the graphical representation are determined. The determining of the first structural primitives comprises grouping the first basic graphical objects based on geometric relations between the first basic graphical objects. A first semantic label is assigned to each of the first structural primitives. A spatial data region of the graphical representation is determined using the first semantic labels of the first structural primitives. Quantitative data values are extracted which are represented by first structural primitives within the data region that are assigned with first semantic labels identifying the respective first structural primitives to represent quantitative data. The extracted quantitative data values are provided in units of pixels according to an image coordinate system. The extracted quantitative data values are transformed from the image coordinate system to a coordinate system of physical units of the quantitative data represented by the graphical representation.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
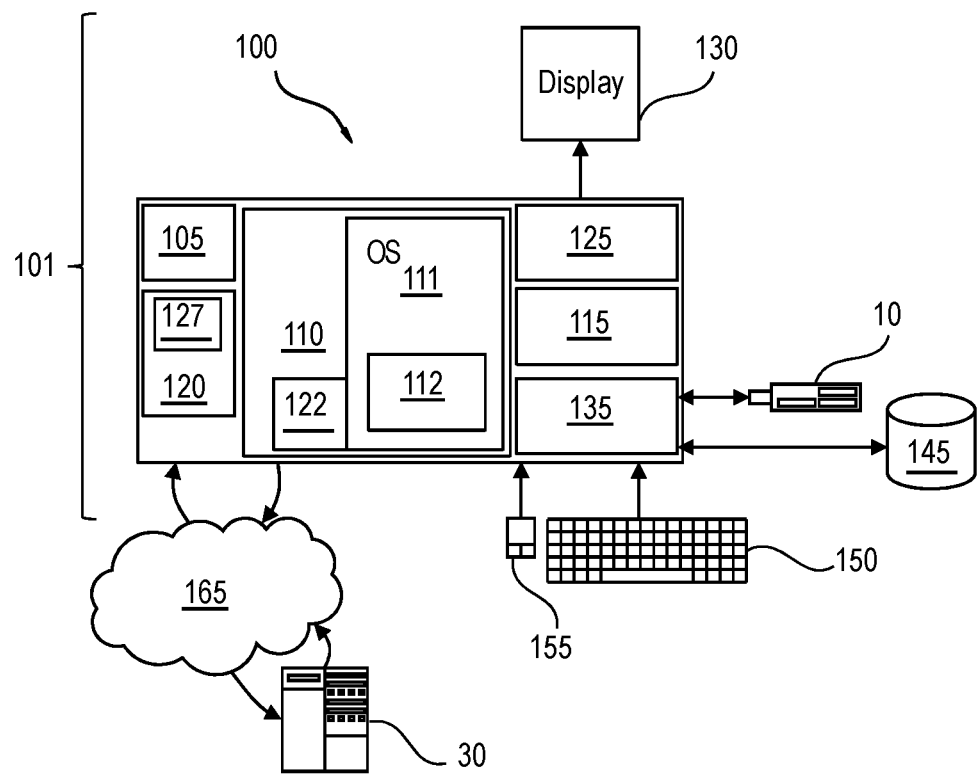
FIG. 1 depicts a schematic diagram illustrating an exemplary system suited for implementing embodiments of the present disclosure.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Ordinal numbers, like e.g. "first" and "second", are used herein to indicate different element assigned with the same name, but not to establish any order of the respective elements.

Embodiments may have the advantage that extracting quantitative data, e.g. in the form of numerical values, directly from a graphical representation such as a graph, chart or plot may provide access to knowledge otherwise inaccessible in a document. Embodiments may provide a fully-automatic method allowing to efficiently extracting quantitative data even from large number of documents.

For example, first the structure of the graphical representation, from which quantitative data is to be extracted, is analyzed from scratch starting with basic graphical objects forming the graphical representation. An understanding of the structure is obtained by determining structural primitives which are assigned with semantic labels, while the data extraction is performed in a subsequent step. The understanding of the structure of the graphical representation which is provided by the sematic labels may allow for a better handling of variations of the appearances shown by different graphical representations. After detecting structural primitives, for example a method based on a probabilistic graphical model, like e.g. a Markov Network, or a rule-based method may be used to semantically label the structural primitives.

The quantitative data may then be extracted and scaled from image coordinates to their original physical coordinates. Thus, a set of quantitative data, e.g. in form of numerical values, may be obtained in a form which is independent of the design of the graphical representation from which the quantitative data is extracted. For example, such a set of quantitative data may be provided and stored in form of a table. The quantitative data may be used for a broad variety of applications like e.g. running a statistical analysis, identify trends based on the respective quantitative data, forecast/extrapolate future behaviors, simulate models or compare own data, e.g. experimental results, with the quantitative data published in a digital document or a digital copy of a document. Furthermore, the quantitative data may for example be used for re-publishing the same data using a graphical representation with a modified design.

Embodiments may have the beneficial effect that they are able to consider real digital images comprising graphical representations of quantitative data, e.g. scatter plots, line chart, bar chart, histogram, pie chart, flow chart or the like. The respective digital images may be generic digital images, extracted from a digital document or a scan of a printed image. The graphical representation may comprise additional structural primitives within the data region which are not representing quantitative data value but may providing additional information like a grid, a legend, or text annotations. No restrictive assumptions may be required regarding the structure of the graphical representation such as the absence of a grid or any other element in the data region that is not data. Thus, embodiments may not require to reduce the appearance variability of the graphical representation, i.e. being restricted to graphical representations with a specific predefined layout only, from which quantitative data may be extracted. Embodiments may have the beneficial effect that they for example allow automatically extracting real numerical data in original data coordinates. Thus, there may be no need for converting extracted data to real scale data manually.

Structural primitives may be mapped to semantics, i.e. being assigned with semantic labels, using e.g. either a rule-based approach or an approach based on a probabilistic graphical model, in both cases unlabeled structural primitives are assigned with semantic labels. A probabilistic graphical model is a probabilistic model for which a graph expresses the conditional dependence structure between random variables. For assigning semantic labels, basic graphical objects may be grouped to structural primitives, i.e. graphical objects that can be labelled using context information, in particular geometric information. The semantic labels may be assigned based on a cognitive understand, i.e. an understanding of the meaning of different and/or common features of structural primitives as well as context information, like e.g. where the respective structural primitives are located and/or which additional structural primitives are present. Different options for a labelling may be provided and the decision of which label is suitable may be made depending on a case by case basis. Basic graphical objects may for example comprise straight line segments, curved line segments and/or characters. Structural primitives may for example comprise rectangles, half rectangles, lines, grids, strings and/or characters. For example, four lines that intersect with 90 degrees' corners may form a rectangle. A rectangle may e.g. be either axes, a box of a legend or a frame that encapsulates the whole diagram. Structural primitives may be transformed into labeled primitives by assigning a semantic label. Labeled primitives may comprise among others, title, caption, axes, {x, y}-label, ticks, tick values, markers, frame, legend box, etc.

According to embodiments, the assigning of the first semantic labels is performed using a probabilistic graphical model which performs the assigning of the first semantic labels in a statistical way. Embodiments may have the advantage that using a probabilistic graphical model may provide an efficient way of dealing with a great variety of different layouts of graphical representations from which quantitative data is to be extracted. A probabilistic model may for example be automatically trained to identify suitable sematic labels for structural primitives and assign the respective labels.

According to embodiments, the probabilistic graphical model may be a Markov network which is generated using a Markov logic network. Embodiments may have the beneficial effect that they are providing an efficient implementation of a probabilistic graphical model.

A Markov logic network is a probabilistic logic which applies the ideas of a Markov network to first-order logic enabling uncertain inference. A Markov network is a probabilistic graphical model comprising set of random variables having a Markov property described by an undirected graph. A Markov logic network (MLN) provides a first-order knowledge base with a weight attached to each formula. It may be viewed as a template for constructing Markov networks. From the point of view of probability, MLNs may provide a compact language providing a specification of very large Markov networks as well as a flexible and modular incorporation of a wide range of domain knowledge into the Markov networks. From the point of view of first-order logic, MLNs may provide an efficient handling of uncertainties tolerating imperfect and contradictory knowledge as well as reducing brittleness. Many tasks in statistical relational learning, like collective classification, link prediction, link-based clustering, social network modeling, and object identification, may naturally be formulated as instances of MLN learning and inference.

According to embodiments, the method further comprises using machine learning to train the probabilistic graphical model for assigning the first semantic labels. Embodiments may have the advantage that they allow to provide an efficient and effective probabilistic graphical model that may be able to assign semantic label to structural primitives determined from an arbitrary graphical representation which has been generated using an automated approach. A Markov logic network may for example be used to generate a Markov network from a set of first-order formulas and training examples.

According to embodiments, the machine learning comprises providing a knowledge base for the probabilistic graphical model comprising a plurality of formulas defining potential rules for assigning semantic labels. The probabilistic graphical model is provided with a training set of digital images with a known semantic structure. For each of the training images second structural primitives are determined using second basic graphical objects detected in the training images and assigning second semantic labels to the second structural primitives by applying the formulas. A weight is assigned to each of the formulas indicating the likelihood of the formula being true using a comparison of the assigned second semantic labels with the known semantic structure of the training images. For the assigning of the first semantic labels the probabilistic graphical model with the knowledge base comprising the formulas which are assigned with the weights is provided. Embodiments may have the advantage of providing an efficient method for implementing machine learning for the probabilistic model.

According to embodiments, in case one of the second structural primitive remains unlabeled, the machine learning further comprises identifying the unlabeled second structural primitive as undefined. At least one additional formula is added to the knowledge base. The at least one additional formula defines a potential rule for assigning a semantic label to the undefined second structural primitive. The assigning of the second semantic labels to the second structural primitives and the assigning of the weights to the formulas of the knowledge base are repeated taking into account the at least one additional formula. Embodiments may have the advantage of providing an efficient method for extending and/or improving the probabilistic graphical model, in particular for extending its usability on graphical representation with new structural features.

According to embodiments, the assigning of the first semantic labels is performed using a set of fixed predefined rules. Embodiments may have the advantage that it provides a direct and effective approach to implement a cognitive understanding of the semantic meaning of possible structural primitives.

According to embodiments, the determining of the first structural primitives and the assigning of the first semantic labels are performed iteratively. Embodiments may have the advantage that a partial understanding of the structure of the graphical representation gained from structural primitives which already are identified and labeled may be used to determine further structural primitives using remaining basic graphical objects which have not been grouped to form structural primitives yet.

According to embodiments, the determining of the data region comprises identifying first structural primitives among the determined first structural primitives that are labeled as axes and determining the spatial region of the graphical representation that is framed by the axes as the data region. Embodiments may have the advantage that they provide an efficient approach to define a spatial region within which quantitative data may be found, while outside of the respective region no quantitative data may be found but rather additional information, e.g. on the physical units of the quantitative data. In case the axes are not part of a rectangle, but rather a L-shaped half rectangle, the respective half rectangle may be completed to form a full rectangle and the spatial region within the rectangle being determined as the data region.

According to embodiments, the method further comprises in preparation of the extraction of quantitative data values identifying first structural primitives among the determined first structural primitives which are located within the data region and which are assigned with first semantic labels that are identifying the respective first structural primitives as not representing quantitative data values. The identified first structural primitives are removed from the data region. Embodiments may have the advantage that the spatial region of the graphical representation which is determined to contain the quantitative data to be extracted is cleaned up such that all what remains are structural primitives representing quantitative data. However, this cleaning up may not require any specific layout of the graphical representation, but may be applied to any arbitrary layout of graphical representation. Performing the data extraction only from a spatially restricted and cleaned up region of the graphical representation may allow an efficient data extraction independent of layout details of the graphical representation and improve the accuracy of the extracted data values.

According to embodiments, in case the first structural primitive to be removed spatially overlaps with one or more of the first structural primitive which are assigned with first semantic label identifying the respective first structural primitive to represent the quantitative data, the removing is performed using a mathematical morphology operation. Embodiments may have the advantage that an efficient and accurate extraction of data from the graphical representation may be enabled even in case structural primitives representing quantitative data may be overlapped by other structural primitives like e.g. a grid, a line, a label, a title, an annotation or a legend box.

According to embodiments, the extracting of the quantitative data values comprises determining the geometric center of each of the first structural primitives which are assigned with a first semantic label identifying the respective first structural primitive to represent the quantitative data and extracting the coordinates of the geometric centers according to the image coordinate system. Embodiments may have the advantage that they provide an efficient method of identifying the precise image coordinates and thus the quantitative data values indicated by the spatially extended structural primitives.

According to embodiments, the method further comprises in preparation of the extraction of the quantitative data values correcting the orientation of the graphical representation such that the first structural primitives that are labeled as axes are aligning parallel to the coordinate axes of the image coordinate system. Embodiments may have the advantage of ensuring a parallel alignment of the coordinate system of physical coordinates indicated by the axes of the graphical representation and the image coordinates indicated by the boundary of the digital image. Thus, the transformation from the image coordinates to physical coordinates of the represented quantitative data may be facilitated.

According to embodiments, the first basic graphical objects comprise line elements and characters. Embodiments may have the advantage that. The line segments may be straight line segments and/or curved line segments. For example, in case of a scatter plot or line graph, markers indicating quantitative data values may be detected as characters. Characters may comprise any type of alphanumeric signs, like e.g. Arabic and Roman numbers, letters from known alphabets, punctuation marks, special characters, like e.g. "&", "%" etc., and/or any type of compact continues structural element of the typical size of a numbers or letters used in the graphical representation, like e.g. triangles, discs, squares or diamonds.

According to embodiments, the geometric relations between the first basic graphical objects which are provided in form of line elements comprise angles and positions of the intersections of the respective line elements. According to embodiments, the grouping of the first basic graphical objects comprises grouping the first basic graphical objects which are provided in form of characters into strings comprising one or more of the characters. Embodiments may have the advantage that structural primitives may efficiently be determined based on grouping different types of basic graphical objects differently.

According to embodiments, the method further comprises extracting the first structural primitives which are provided in form of strings using an optical character recognition algorithm. Embodiments may have the advantage that the assignment of a semantic label may be facilitated taking into account the meaning of the structural primitives. Furthermore, structural primitives comprising only single characters or a set of characters without a literal or numerical meaning may be identified. Such structural primitives may for example markers representing quantitative data values. Also additional information about the graphical representation like a title may be extracted in order to use it for post-processing, like e.g. storing and identifying the extracted quantitative data.

According to embodiments, the method further comprises determining the parameters of the transformation of the extracted quantitative data values from the image coordinate system to the coordinate system of physical units using the strings provided by the first structural primitives that are labeled as tick values and determining for each of the respective strings coordinate values of one or more of the first structural primitives that are labeled as a tick and associated with the string. The coordinate values are provided in units of pixels according to the image coordinate system. Embodiments may have the advantage of providing an efficient method for implementing the transformation of the extracted quantitative data values from the image coordinate system to the coordinate system of physical units in case of graphical representations comprising ticks and tick values.

According to embodiments, the method further comprises applying an error detection and correction algorithm using regression to the first structural primitives labeled as tick values which have been extracted using the optical character recognition algorithm. Embodiments may have the advantage that errors regarding the extraction of tick values used e.g. for the transformation of the extracted quantitative data may efficiently be corrected. Such errors may for example result from a low quality, e.g. low contrast or incomplete shape, or errors from OCR of the characters forming the tick values. Furthermore, dictionaries may be used in order to detect and correct errors in the OCR extraction of other types of strings, like e.g. titles or annotations.

According to embodiments, the method further comprises storing for post-processing the extracted and transformed quantitative data values together with the first structural primitives which are extracted by the optical character recognition algorithm and which are assigned with first semantic labels that are identifying the respective first structural primitives as not representing quantitative data values. Embodiments may have the advantage that broad variety of post-processing steps is enabled, like e.g. reprinting the graphical representation with a new layout or using the extracted data values for new calculations.

According to embodiments, the graphical representation comprises markers representing the quantitative data values. The assigning of the first semantic labels comprises labelling as a marker each of the first structural primitives which is provided by a single character located within the data region. Embodiments may have the advantage that structural primitives representing the quantitative data values may efficiently be determined.

According to embodiments, the quantitative data comprise a plurality of quantitative data series. The method further comprises determining the individual data series by clustering the first structural primitives which are assigned with a first semantic label identifying the respective first structural primitives to represent the quantitative data using a clustering algorithm. According to embodiments, the method further comprises determining the number of individual data series which are comprised by the quantitative data using a legend provided by one or more of the first structural primitive which are labeled as legend or by determining the maximum number of the first structural primitive which are labeled as markers and assigned to a common one of the first structural primitives which is labeled as a tick of a vertical coordinate axis of the graphical representation. Embodiments may have the advantage that even a plurality of quantitative data series may efficiently be handled.

According to embodiments, the method further comprises performing a quality check of the extraction procedure by generating a graphical representation of the extracted and transformed quantitative data values and comparing the generated graphical representation with the graphical representation of the digital image. Embodiments may have the advantage that they may allow for an efficient quality check of the extraction procedure. In case deviations are detected the deviating quantitative data values may for example be corrected and/or the extraction procedure may be repeated.

Embodiments of the computer program product for automatically extracting data from a digital image providing a graphical representation of quantitative data may be suitable for executing each of the methods described above. Embodiments may have the advantage that they provide a computer program product providing a fully-automatic method allowing to efficiently extracting quantitative data even from large number of documents.

Embodiments of the computer system for automatically extracting data from a digital image providing a graphical representation of quantitative data may be suitable for executing each of the embodiments described above. Embodiments may have the advantage that they provide a computer system providing a fully-automatic method allowing to efficiently extracting quantitative data even from large number of documents.

FIG. 1 shows a schematic diagram illustrating an exemplary general system 100 suited for implementing embodiments of the present disclosure. It will be appreciated that the general system 100 described herein may be any type of computerized system comprising a plurality of processor chips, a plurality of memory buffer chips and a memory. The general system 100 may for example be implemented in form of a server, an embedded computerized system or general-purpose digital computer, such as a personal computer, workstation, minicomputer, or mainframe computer. The most general system 100 therefore includes a general-purpose computer 101.

The computer 101 may in particular be configured as a server, i.e. being optimized for a high speed data exchange with a large number of clients. The computer 101 may further provide a large processing capacity, i.e. CPU capacity, and/or large memory capacity. Furthermore, the software in memory 110 may comprise a server software application for processing a large number of requests by clients.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor-based microprocessor (in the form of a microchip or chip set), a macroprocessor, or generally any device for executing software instructions.

The memory 110 can include any one or combination of volatile memory modules (e.g., random access memory (RAM, such as DRAM, SRAM, SDRAM, etc.)) and non-volatile memory modules (e.g., ROM, erasable programmable read only memory (EPROM), electronically erasable programmable read only memory (EEPROM), or programmable read only memory (PROM)). Note that the memory 110 can have a distributed architecture, where additional modules are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions for automatically extracting data from a digital image comprising a graphical representation of quantitative data. In addition, the memory 110 may comprise one or more digital images to be processed executing the instructions 112. Furthermore, quantitative data values, e.g. data series, extracted by executing the instructions 112 may be stored in memory 110. The extracted data values may be stored together with additional information about the extracted data values, like e.g. a title of the representation from which the data values have been extracted. This additional information may as well be extracted from the digital image and be used for a post-processing of the extracted data. The memory 110 may further comprise instructions for implementing machine learning to train the probabilistic graphical model for assigning semantic labels. In order to support the machine learning procedure, the memory 110 may comprise a training set of digital images.

The software in memory 110 shall also typically include a suitable operating system (OS) 111. The OS 111 essentially controls the execution of other computer programs, such as possibly software 112.

In exemplary embodiments, a conventional keyboard 150 and mouse 155 can be coupled to the input/output controller 135. Other output devices such as the I/O devices 10, 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured for executing software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

Software 112 may further be provided stored on any computer readable medium, such as storage 120, for use by or in connection with any computer related system or method. The storage 120 may comprise a disk storage such as HDD storage.

Figure 2:
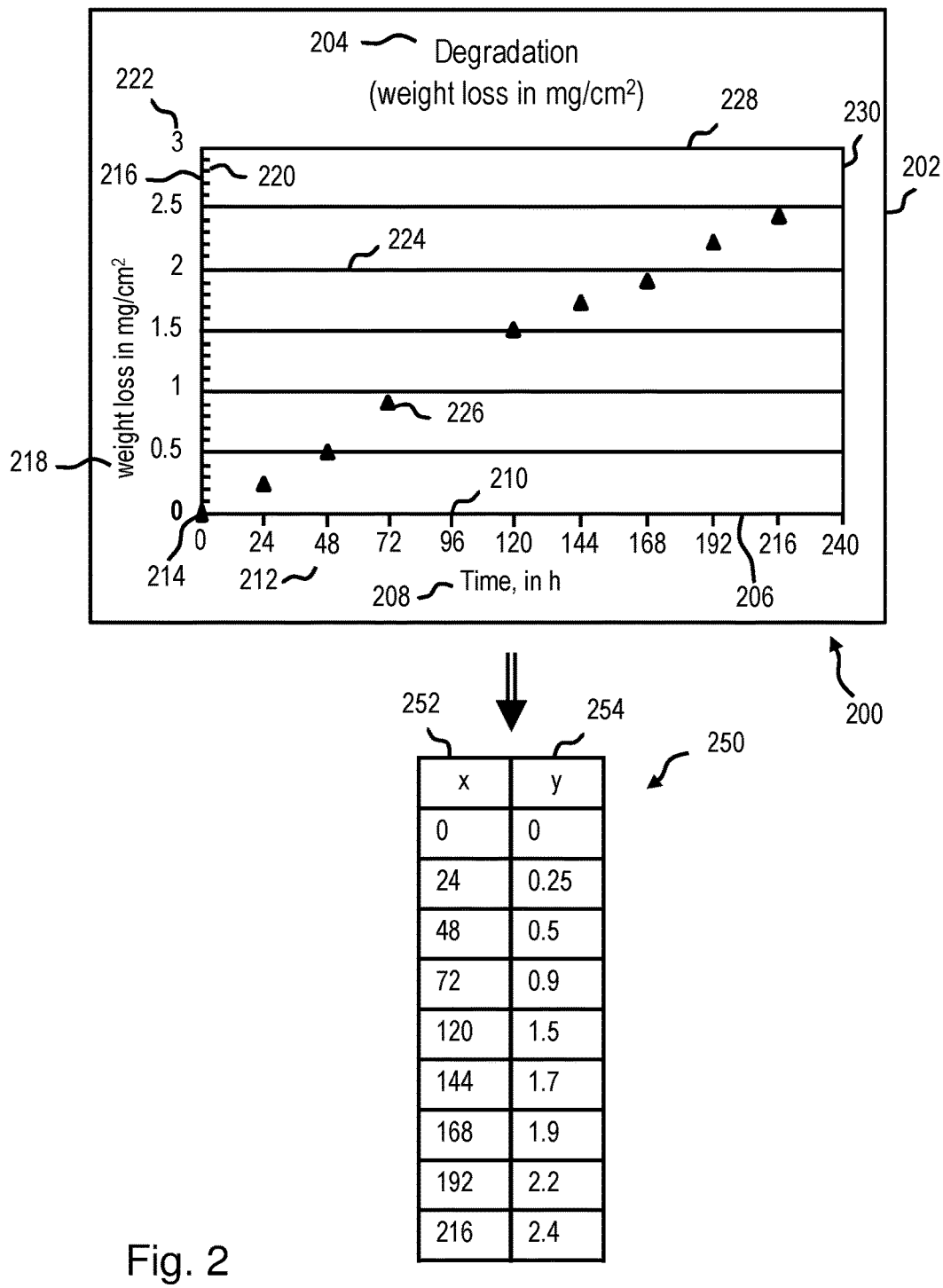
FIG. 2 depicts a schematic diagram illustrating an example of data extraction from a first exemplary digital image.

FIG. 2 shows a schematic diagram illustrating a first exemplary digital image providing a graphical representation 200 of quantitative data in form of a scatter plot. The design of different graphical representations may vary significantly. The representation 200 of FIG. 2 is for example encapsulated by a frame 202 and comprises a title 204. A box comprising an x-axis 206 and a y-axis 216 as well as two additional lines 228, 230 which extend parallel to the axes 206, 216 and complete the respective box. The box limits a data region comprising markers 226 in the form of triangles each indicating a single quantitative data value. The data region further comprises grid lines 224 which extend parallel to the x-axis 206 and some of which overlap with the markers 226. The two axes 206, 216 intersect at the origin 214 of the scatter plot. At axes 206, 216 a plurality of ticks 210, 220 is located, some of which are assigned with tick values 212, 222. Furthermore, the axes 206, 216 are assigned with axis labels 208, 218.

Embodiments of the aforementioned method for automatically extracting data from a digital image providing the graphical representation 200 may for example result in a data set arranged in a table 250 comprising two columns 252, 254. Each extracted and transformed quantitative data value may comprise two numerical values representing an x-value listed in column 252 and a y-value listed in column 254. This data set provided by table 250 may e.g. be used for reprinting the respective data or for performing an additional data analysis.

Figure 3:
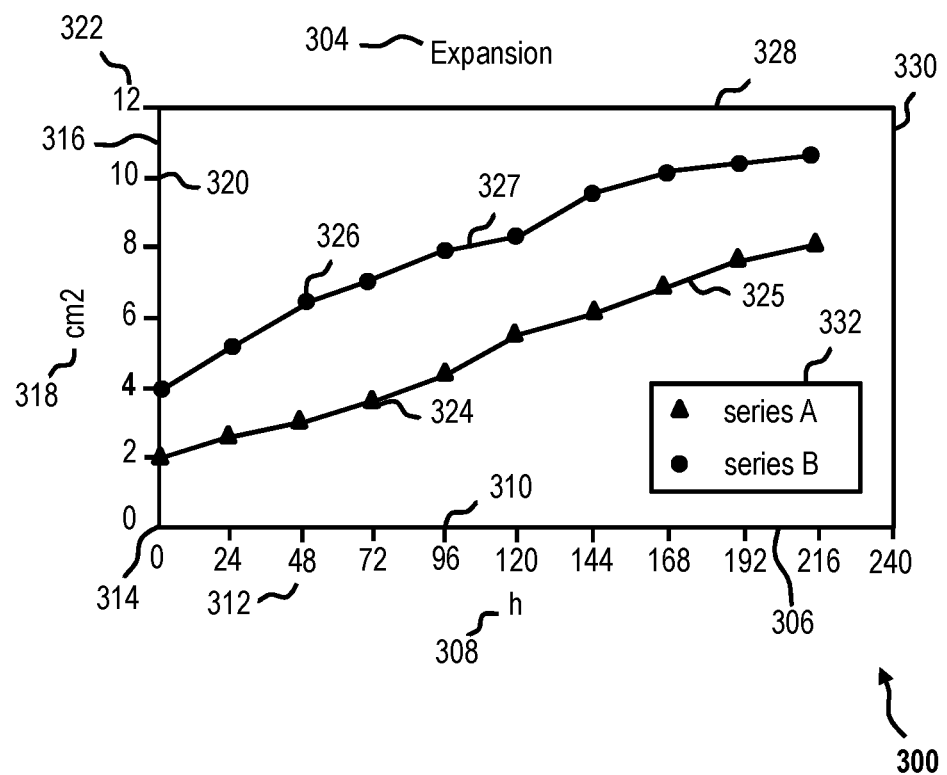
FIG. 3 depicts a schematic diagram illustrating a second exemplary digital image.

FIG. 3 shows a schematic diagram illustrating a second exemplary digital image providing a graphical representation 300 of quantitative data. The graphical representation 300 is provided in form of a line chart comprising two data series indicated by two different types of markers 324, 326, i.e. circles and triangles. Common markers 324, 326 of the same data series are connected by straight line segments 325, 327. The data region limited by the two axes 306, 316 intersecting at the origin 314 and the parallel lines 328, 330 further comprises a legend box 332 providing a legend. At the axis 306, 316 ticks 310, 320 are provided as well as numerical tick values 312, 322. Finally, the labels 308 and 318 of the axes 306, 316 are significantly shorter than the ones comprised by FIG. 2.

Figure 4:
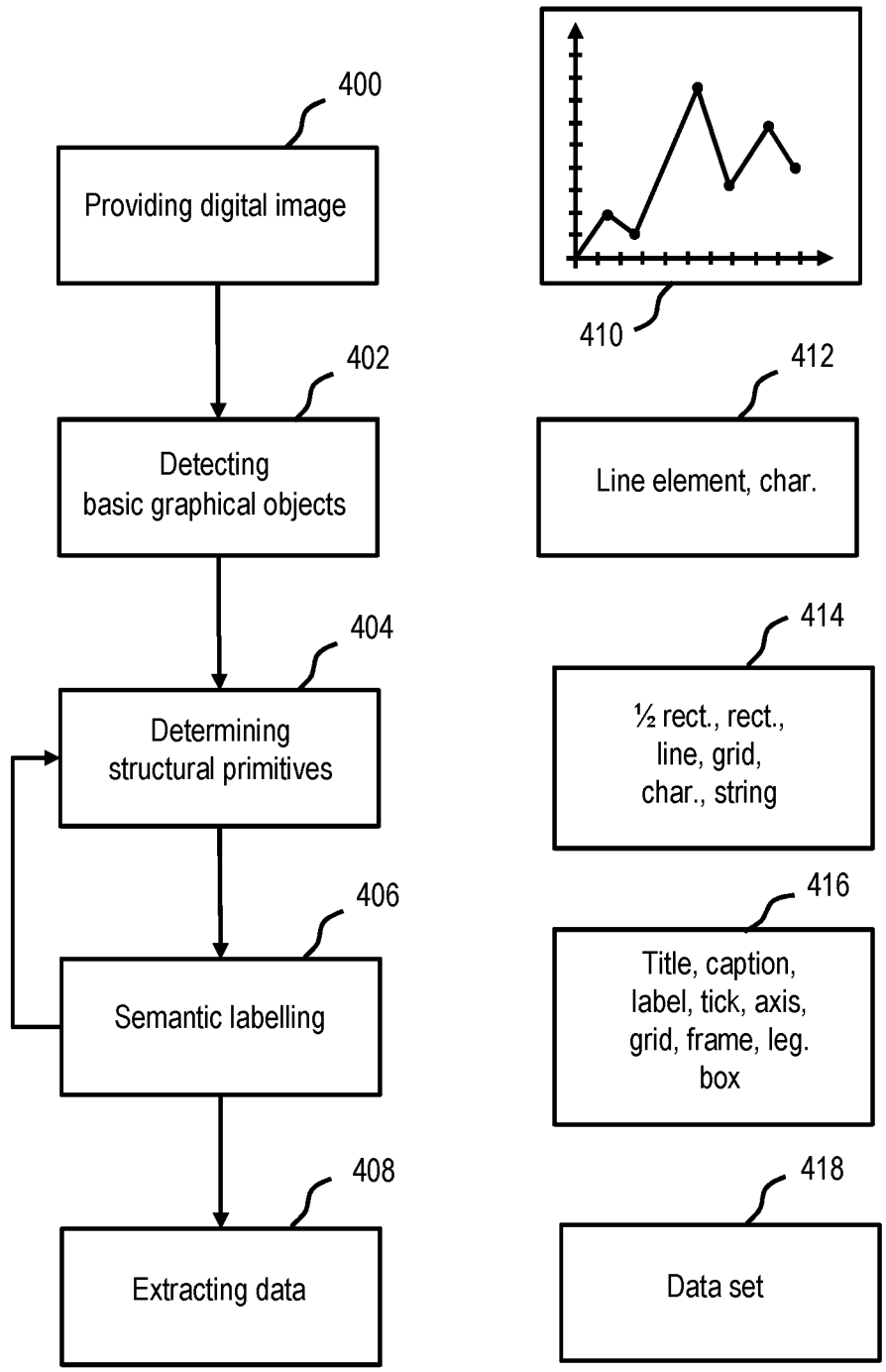
FIG. 4 depicts a first schematic flow diagram illustrating an exemplary method.

FIG. 4 shows a first schematic flow diagram illustrating an exemplary method for automatically extracting data from a digital image 410 providing a graphical representation of quantitative data. In block 400, the digital image 410 is provided for extracting quantitative data. In block 402, basic graphical objects 412, like e.g. straight lines and characters, are detected from the digital image 410. In block 404, structural primitives 414 are determined in order to build a precise and complete understanding of the structure of the graphical representation provided by the digital image 410. The structural primitives 414 determined may comprise e.g. half rectangles, rectangles, lines, grids, characters and/or strings. In block 406, the structural primitives 414 are labelled according to their semantics using semantic labels resulting in label primitives 416. Labeled primitives 416 may e.g. comprise titles, captions, labels, ticks, axes, grids, frames, and/or legend boxes. Depending on its position, size and neighboring primitives, a line may for example be the x-axis of the graphical representation and semantically labelled as such or it may be tick. The two blocks of determining structural primitives 404 and labeling the determined structural primitives with labels 406 may be repeated iteratively. Performing those two blocks 404, 406 iteratively may allow for benefiting from already detected and labelled structural primitives, when detecting further structural primitives. Finally, after each basic graphical object detected in the digital image 410 has been grouped on its own or together with further basic graphical objects to form structural primitives and assigned with semantic labels, the quantitative data comprised by the data region of the graphical representation may be extracted in block 408. The understanding of the structure of a graphical representation as implemented by the semantic labels may allow for extracting quantitative data from the correct region of the image, e.g. from the data region framed by the axes, and to remove elements comprised by the data region that are no data such as a legend box and its content or a grid. This may have the beneficial effect, that there is no need to make a strong assumption regarding a clean data region. It may rather be possible to efficiently handle the appearance variability of different types of digital images with graphical representations from which data are to be extracted. The extraction of quantitative data in block 408 may result in one or more sets of quantitative data 418 provided e.g. in form of one or more tables.

Figure 5:
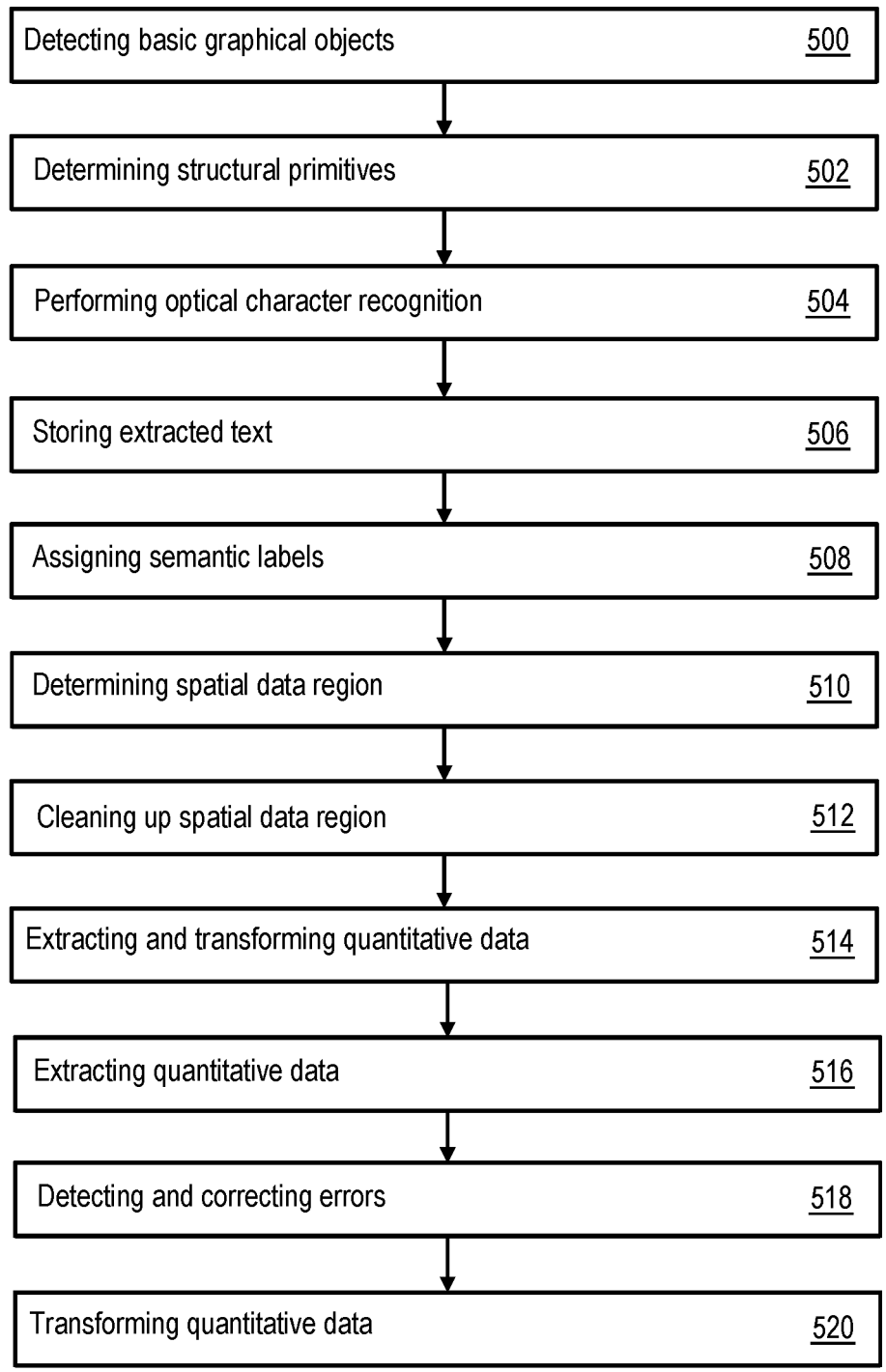
FIG. 5 depicts a second schematic flow diagram illustrating an exemplary method.

FIG. 5 shows a second schematic flow diagram illustrating an exemplary method for automatically extracting data from a digital image providing a graphical representation of quantitative data. The digital image may first be thinned using a suitable thinning algorithm, like the Zhang-Suen thinning algorithm. In block 500, basic graphical objects are detected. The basic graphical objects may be provided in form of characters or straight line elements. For detecting straight lines, the Hough transform may be used. Each straight line may be parametrized by a radius $\rho$ and the angle $\rho$ of its normal intersecting the origin. The Hough transform constructs the $\rho$-$\theta$ parameters space and uses voting-based technique, which results in a 2D histogram of $\rho$-$\theta$ parameters. In more detail, the linear Hough transform algorithm uses a two-dimensional array, also called an accumulator, to detect the presence of a line described use of the Hesse normal form by $\rho = x \cos \theta + y \sin \theta$. The dimension of the accumulator equals the number of unknown parameters, i.e., two, considering quantized values of $\rho$ and $\theta$ in the pair ($\rho$, $\theta$). For each pixel at (x, y) and its neighborhood, the Hough transform algorithm determines if there is enough evidence of a straight line at that pixel. If there is enough evidence, the parameters ($\rho$, $\theta$) of the respective line are calculated, the bin accumulator into which the parameters fall is determined, and value of the respective bin is incremented. By finding the bins with the highest values, e.g. by looking for local maxima in the accumulator space, the most likely lines may be extracted, and their approximate geometric definitions read off.

The final result of the linear Hough transform is a two-dimensional matrix similar to the accumulator, one dimension of this matrix is provided by the quantized angle $\theta$ and the other dimension is provided by the quantized distance p. Each element of the matrix has a value equal to the sum of the points or pixels that are positioned on the line represented by quantized parameters ($\rho$, $\theta$). So the element with the highest value indicates the straight line that is most represented in the input image.

Lines may be detected at specific angles by specifying a reduced parameter subspace along the $\theta$ dimension of the histogram in the Hough transform. For example, only values of $\theta$ are kept in an interval around the specific angle. The width of that interval may depend directly on the desired tolerance for skewness of the image. This may not only allow to search for lines at specific angles, but also improve both the memory and computation efficiency of the Hough transform. In order to compute the pixel support of the detected lines, the intersection between each line and the image may be computed and the pixels in the intersection may be assigned to the respective line. In order to remove distinct lines sharing most of their pixels, lines may further be filtered. A non-maximal suppression algorithm for filtering may be designed in the following way: first, the number of common pixels between two lines may be computed for each pair of lines, and if that number is greater than a threshold, only the line with the largest total number of pixels is kept. Finally, disconnected small components of the lines may be removed.

In block 502, structural primitives of the graphical representation are determined comprising a grouping of the detected basic graphical objects into groups comprising one or more basic graphical objects. The grouping may be based on geometric relations between the basic graphical objects. The structural primitives may provide new, more complex elements such as strings of text formed from characters or rectangular frames or grids formed from straight lines.

Single characters may be grouped together into strings using a predefined set of rules. The challenge when grouping characters may come from the unknown orientation of each character and the relatively high probability of a string being oriented vertically, i.e. rotated by 90 degrees with respect to the orientation of an image. Moreover, strings with different orientations may be located spatially close to each other in an image. For example, the y-axis label is usually oriented vertically, while the y-axis tick values are usually oriented horizontally.

The present disclosure proposes a grouping algorithm proceeding sequentially, by first grouping pairs of characters horizontally when two characters satisfy the following set of rules:

in case of two characters of different height, a height ratio of a smaller one of the two characters over a larger one of the two characters being greater than a first predefined threshold provided by the typographic x-height over the ascender-height, an angle formed by a segment linking the centroids of the two characters and a horizontal reference axis being within a first interval defined by a first pair of predefined thresholds, a first one of the first pair of thresholds corresponding to a segment angle of a character with an ascender followed by a character with a descender, a second one of the first pair of thresholds corresponding to a segment angle of a character with a descender followed by a character with an ascender, the signed horizontal distance between the two characters being within a second interval defined by a second pair of predefined thresholds, the signed vertical distance between the two characters being within a third interval defined by a third pair of predefined thresholds.

The same set of rules may be used to group pairs of characters vertically with the additional condition, favoring horizontal grouping over vertical grouping. that neither element of a valid pair of elements should be part of a horizontal grouping of length greater than a predefined threshold:

in case of two characters of different height, a height ratio of a smaller one of the two characters over a larger one of the two characters being greater than a first predefined threshold provided by the typographic x-height over the ascender-height, an angle formed by a segment linking the centroids of the two characters and a vertical reference axis being within a first interval defined by a first pair of predefined thresholds, a first one of the first pair of thresholds corresponding to a segment angle of a character with an ascender followed by a character with a descender, a second one of the first pair of thresholds corresponding to a segment angle of a character with a descender followed by a character with an ascender, the signed horizontal distance between the two characters being within a second interval defined by a second pair of predefined thresholds, the signed vertical distance between the two characters being within a third interval defined by a third pair of predefined thresholds, neither of the two characters being part of a horizontal grouping of characters of a length greater than a second predefined threshold.

In block 504, the detected strings are processed by using an optical character recognition (OCR) algorithm provided by an OCR engine, e.g. the Tesseract OCR engine. In block 506, the resulting text extracted from the detected strings may be stored. Numerical values may be extracted as well in cases e.g. where the string contains numerical values as it is typically the case for axes ticks.

In a similar fashion, subsets of straight lines may be grouped together in block 502 e.g. into either half-rectangles, rectangles or grid structures using a set of rules. These rules may for example specify at which angle lines potentially being part of the new primitive should intersect. For example, the angle may be required to lie within an interval around $\pi/2$, like e.g. $\pi/2\pm1\%$ or $\pi/2\pm2\%$. These rules may further specify which parts of the lines should intersect: for example, the extremities of the lines, i.e. their ends, may intersect in the case of a rectangle or at periodic intervals in the case of a grid.

Once structural primitives have been detected, an understanding of the image structure may be provided by a semantic labelling of those structural primitives in block 508. By semantic labelling structural primitives are basically mapped to semantically meaningful objects. The mapping may allow to answer questions about the image structure such as which text string is the title of the figure, which text string is the x-axis label, or which rectangle defines the axes, the legend box or the image frame, etc. According to embodiments, block 508 may be performed before block 506.

A mapping of structural primitives may be defined by rules. Rule-based labelling may be particularly simple. However, semantic labelling of structural primitives may constitute a collective classification task, since the labels of different structural primitives may not be independent. Therefore, a rule-based classification system may require feedback loops in order to label primitives according to labels of other primitives.

Embodiments of the present invention may use probabilistic graphical models. Probabilistic graphical models enable an efficient handling of uncertainties as well as statistical dependencies between primitives. Given a Markov network also called a Markov random field, modelling statistical dependencies between a set of variables including observed variables, i.e. features that maybe extracted from the detected structural primitives, and unobserved labels, the labelling task becomes a so-called maximum a posteriori (MAP) problem. A MAP estimate of an unknown, e.g. unobserved, quantity is a mode of a posterior distribution containing all the knowledge about an unknown quantity. The MAP estimate maximizes the respective probability distribution function or probability mass function and may be used to obtain a point estimate of an unobserved quantity on the basis of empirical data. A challenge of using a Markov network for mapping structural primitives is to correctly define the structure of the network as well as the dependencies between variables, which may be accounted for by using a Markov logic network.

A Markov Logic Network (MLN) is a set of weighted first-order logic formulas and may be viewed as a template for constructing Markov networks. A first-order domain is defined by a set of constants, which is assumed to be finite, representing objects in the domain and a set of predicates representing properties of those primitives and relations between them. For a semantic labelling of structural primitives, the set of constants may comprise respective structural primitives and labels. Examples of predicates that may be defined are "Has Label(x, AXES)" used to label the structural primitive x as axes or "Contains(x, y)" indicating that the structural primitive x contains the structural primitive y.

A predicate may be grounded by replacing its variables with constants. A world is an assignment of a truth value to each possible ground predicate, i.e. ground atom. Atoms are the simplest well-formed formulas of a logic. In first-order logic an atom is a predicate applied to a tuple of terms with all other well-formed formulae being obtained by composing atoms with logical connectives and/or quantifiers. An atom is called a ground atom, when all of the terms in the atom are ground terms, i.e. term without any free variables. A first-order knowledge base (KB) is a set of formulas in first-order logic, constructed from predicates using logical connectives and quantifiers. In first-order logic, the KB is a set of hard constraints on the set of possible worlds. Whenever a world violates one formula, it has zero probability.

In MLN these constraints are softened and the ability is added to handle uncertainty and tolerate imperfect and contradictory knowledge. MLN may be considered as a log-linear model with one node per ground atom and one feature per ground formula. The joint distribution over possible worlds x is given by $$P(X = x) = \frac{1}{Z}\exp\left(\sum_{i=1}^{n} w_i f_i(x_{\{i\}})\right)$$

with Z being a partition function. The above joint distribution refers to a set F of first-order formulas $F_i$ in MLN, where n is the number of formulas $F_i$ in F, $x_{\{i\}}$ is a state of ground atoms appearing in the formula $F_i$ and the feature function $f_i(x_{\{i\}})=1$, if $F_i(x_{\{i\}})$ is true and 0 otherwise. The weight $w_i$ indicates the likelihood of the formula $F_i$ being true. A world that violates one formula in the knowledge base is less probable than one that does not violate any formula but not impossible.

For instance, the knowledge "A rectangle that contains another rectangle labelled as axes is the image frame." maybe described using the formula:

$\forall r_1, r_2, \text{Contains}(r_1, r_2) \wedge \text{Has Label}(r_2, \text{AXES}) \Rightarrow \text{Has Label}(r_1, \text{IMAGE\_FRAME})$.

A KB may be defined with such formulas, using an understanding of what the structure of a graphical representation is. At training time, the weight of each formula in the KB may be learned from a training set of artificially generated images. At labelling time, MAP inference may be performed on the Markov network and the most probable label assigned to each structural primitive.

Once the structure of a graphical representation is known, a spatial data region of the graphical representation from which quantitative data is to be extracted may be determined in block 510. In block 512, structural primitives not representing quantitative data values, like e.g. a grid, a legend and text, may be removed from inside of the axes, i.e. the data region. If necessary, the resulting graphical representation may be rotated in order to compensate for any detected skewness given by the angle at which the structural primitives labels as axes are oriented relative to the coordinate axes of the image coordinate system. Finally, only the data region is kept by cropping the image. The resulting image ideally only contains data: e.g. either markers, in the case of scatter plots, or lines with markers superimposed, in the case of line plots. In this case, the markers often represent experimental evidence, such as measurement points, and the lines depict the inferred model. In both cases the markers are of main interest.

From a cropped image of the inside of the axes mathematical morphology may be used to further clean up the data region, e.g. removing lines and keep only markers indicating data points in the image. An opening operation may be performed with a round structural element, i.e. a disc, which size is slightly larger than the width of the lines to be removed. An opening operation is the dilation of the erosion of a set A by a structuring element B: $A \circ B = (A \ominus B) \oplus B$, where $\ominus$ denotes an erosion operation, while $\oplus$ denotes a dilation operation. Finding the center of each remaining connected component in the data region may give the coordinates in image coordinates of the data points corresponding to markers.

In block 514, the quantitative data represented by the remaining structural primitives, like e.g. marker, may be extracted. In block 518, the extracted data may further be transformed from image coordinates in units of pixels to data coordinates in whichever units the data are presented by the graphical representation and finally stored. Given the positions of the center of the x-axis and y-axis ticks and the corresponding numerical value of each of them, the conversion of coordinates may be implemented by a 1-dimensional linear scaling for linear axes and a log scaling for log axes.

In order to be robust to eventual errors in the OCR, resulting in a wrong numerical value for the tick, an error detection and correction algorithm may be applied in block 516. For example, the random sample consensus (RANSAC) algorithm may be used to compute the transformation parameters. The RANSAC algorithm essentially comprises the following iteratively repeated two steps:
1. In a first step, a sample subset of data is randomly selected from the input dataset, the sample subset containing minimal data items. Using only the elements of the sample subset, a fitting model and model parameters corresponding to the fitting model are computed.
2. In a second step, it is checked which elements of the input dataset are consistent with the model instantiated by the model parameters obtained from the first step. A data element will be considered as an outlier if it does not fit the fitting model within some error threshold defining the maximum deviation attributable to the effect of noise.

These two steps are repeated a fixed number of times, each time producing either a model which is rejected because too few points are part of the consensus set, i.e. the set of inliers obtained for the respective model, or a refined model together with a corresponding consensus set size. In the latter case, a model may be saved if its consensus set is larger than the consensus set of the previously saved model. The procedure may be aborted after less repetitions, when a is found consensus set comprising a predefined sufficient number of inliers.

Embodiments may benefit from all detected ticks of a graphical representation making the scaling more robust to outliers. At least two ticks may be required for each axis, but these two ticks may be any two ticks and not necessary e.g. the top, bottom, leftmost and rightmost values. In addition, one or more dictionary may be provided in order to detect and correct further errors in the results of the OCR.

If there is more than one data series comprised by the quantitative data each data series with a different type of markers, a clustering algorithm may be applied to map the markers to data series. A clustering algorithm groups a set of objects in such a way that objects in the same group, i.e. cluster, are more similar to each other regarding one or more predefined criteria, like e.g. their shape, than to those objects in other groups. The number of data series may be known, e.g. either from a legend or from a maximum number of markers detected per tick. Clustering techniques may be used on the marker shapes in order to identify which data series each marker belongs to.

Optionally, a quality check of the result of the extraction procedure, i.e. of the extracted and transformed quantitative data values, may be performed by generating a graphical representation of the quantitative data values and comparing the generated graphical representation with the original graphical representation of the digital image from which the data values have been extracted.

Figure 6:
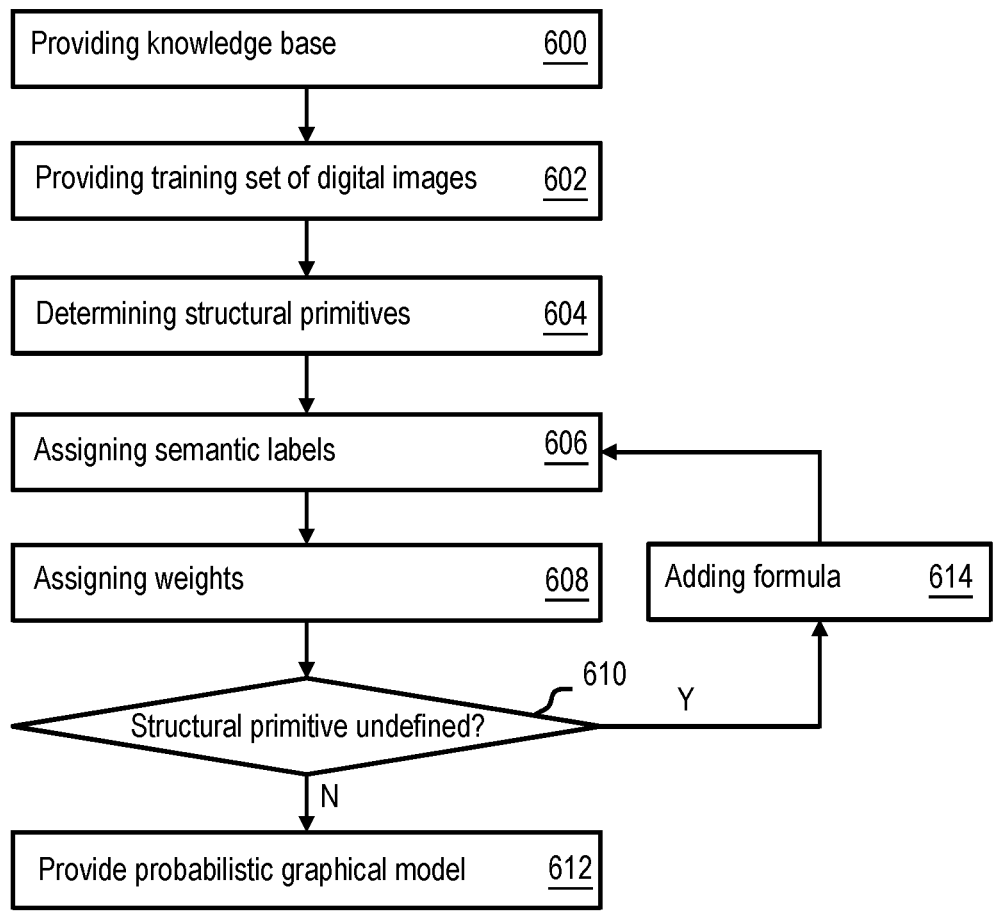
FIG. 6 depicts a third schematic flow diagram illustrating an exemplary method.

FIG. 6 shows a third schematic flow diagram illustrating an exemplary method for machine learning of a probabilistic graphical model, like e.g. a Markov network. In block 600, a knowledge base for the probabilistic graphical model is provided which comprises a plurality of formulas defining potential rules for assigning semantic labels. In block 602, the probabilistic graphical model is provided with a training set of digital images with a known semantic structure. For machine learning a large set of images with graphical representations of quantitative data and corresponding ground truth labels may be required. Ground truth labels comprise information about each structural primitive in each graphical representation, such as its type, position, size and label or the string that a text primitive contains. Ground truth labels may further comprise the numerical values of the data that are plotted. According to embodiments synthetic data may be used, e.g. images generated with the python plotting library Matplotlib.

In order to provide a large variability of appearances of graphical representations of the synthetic data, the structure of the graphical representation may be parametrized and for each image generated, the parameters may be drawn from each parameter distribution. The legend text, the axes labels and the title may be randomly generated, with the number of words sampled from a uniform distribution in an interval $[n_{min}, n_{max}]$ and each word length sample from a uniform distribution in a different interval. Examples of further random parameters include: the likelihood of the figure having a title; the likelihood of the location of that title, like e.g. "right", "center", "left"; the likelihood of the font-sizes, like e.g. "medium", "large", "x—large", "xx—large"; the likelihood of the markers being one of a predefined set of different shapes which sizes are sampled from a uniform distribution on an interval $[size_{min}, size_{max}]$; the likelihood of each axis having a grid and a given grid style, like e.g. "solid", "dashed", "dash-dot", "dotted"; the likelihood of the figure having a frame; the likelihood of the figure having a legend and the likelihood of that legend being in each one of a predefined set of different locations, the set comprising locations outside the axes as well as inside the axes. The range of the y-axis may be randomized. The range of the x-axis may be randomized as well or selected from a predefined set of ranges.

According to further embodiments a set of existing digital images providing graphical representations of quantitative data may be used as a training set. The graphical representations may vary strongly regarding their appearance. For each of the graphical representations of the training set a semantic structure may be provided using crowdsourcing to analyze the individual graphical representations and assign semantic labels. The semantic labels provided by the crowdsourcing may be used as reference labels for the machine learning.

In block 604, for each of the training images structural primitives may be determined using basic graphical objects detected in the training images. In block 606, semantic labels may be assigned to the structural primitives by applying the formulas. In block 608, a weight may be assigned to each of the formulas indicating the likelihood of the formula being true using a comparison of the assigned semantic labels with the known semantic structure of the training images. In block, 610, it may be checked whether any of the structural primitives remains unlabeled. Such unlabeled structural primitives are identified as being undefined. In case no undefined structural primitive remains, the method continuous with block 612 providing the probabilistic graphical model with the knowledge base comprising the formulas which are assigned with the weights for further use to extract quantitative data from real graphical representations.

In case an undefined structural primitive remains in block 610, the method continues with block 614. In block 614, at least one additional formula is added to the knowledge base. The at least one additional formula defines a potential rule for assigning a semantic label to the undefined structural primitive. The method may continue with repeating the assigning of the semantic labels to the structural primitives and the assigning of the weights to the formulas of the knowledge base taking into account the at least one additional formula.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described above may be the following:

1. A computer-implemented method for automatically extracting data from a digital image comprising a graphical representation of quantitative data,
   the method comprising:
   detecting first basic graphical objects forming the graphical representation;
   determining first structural primitives of the graphical representation, the determining of the first structural primitives comprising grouping the first basic graphical objects based on geometric relations between the first basic graphical objects;
   assigning a first semantic label to each of the first structural primitives;
   determining a spatial data region of the graphical representation using the first semantic labels of the first structural primitives;
   extracting quantitative data values which are represented by first structural primitives within the data region that are assigned with first semantic labels identifying the respective first structural primitives to represent quantitative data, the extracted quantitative data values being provided in units of pixels according to an image coordinate system;
   transforming the extracted quantitative data values from the image coordinate system to a coordinate system of physical units of the quantitative data represented by the graphical representation.

2. The method of item 1, the assigning of the first semantic labels being performed using a probabilistic graphical model which performs the assigning of the first semantic labels in a statistical way.

3. The method of item 2, the method further comprising:
   using machine learning to train the probabilistic graphical model for assigning the first semantic labels.

4. The method of item 3, the machine learning comprising:
   providing a knowledge base for the probabilistic graphical model comprising a plurality of formulas defining potential rules for assigning semantic labels;
   providing the probabilistic graphical model with a training set of digital images with a known semantic structure;
   for each of the training images determining second structural primitives using second basic graphical objects detected in the training images and assigning second semantic labels to the second structural primitives by applying the formulas;
   assigning a weight to each of the formulas indicating the likelihood of the formula being true using a comparison of the assigned second semantic labels with the known semantic structure of the training images;
   providing for the assigning of the first semantic labels the probabilistic graphical model with the knowledge base comprising the formulas which are assigned with the weights.

5. The method of item 4, in case one of the second structural primitive remains unlabeled, the machine learning further comprising:
   identifying the unlabeled second structural primitive as undefined;
   adding at least one additional formula to the knowledge base, the at least one additional formula defining a potential rule for assigning a semantic label to the undefined second structural primitive;
   repeating the assigning of the second semantic labels to the second structural primitives and the assigning of the weights to the formulas of the knowledge base taking into account the at least one additional formula.

6. The method of item 1, the assigning of the first semantic labels being performed using a set of fixed predefined rules.

7. The method of any of the previous items, the determining of the first structural primitives and the assigning of the first semantic labels being performed iteratively.

8. The method of any of the previous items, the determining of the data region comprising:
   identifying first structural primitives among the determined first structural primitives that are labeled as axes and determining the spatial region of the graphical representation that is framed by the axes as the data region.

9. The method of any of the previous items, the method further comprising in preparation of the extraction of quantitative data values:
   identifying first structural primitives among the determined first structural primitives which are located within the data region and which are assigned with first semantic labels that are identifying the respective first structural primitives as not representing quantitative data values;
   removing the identified first structural primitives from the data region.

10. The method of item 9, in case the first structural primitive to be removed spatially overlaps with one or more of the first structural primitive which are assigned with first semantic label identifying the respective first structural primitive to represent the quantitative data, the removing being performed using a mathematical morphology operation.

11. The method of any of the previous items, the extracting of the quantitative data values comprising:
    determining the geometric center of each of the first structural primitives which are assigned with a first semantic label identifying the respective first structural primitive to represent the quantitative data and extracting the coordinates of the geometric centers according to the image coordinate system.
12. The method of any of the previous items, the method further comprising in preparation of the extraction of the quantitative data values:
    correcting the orientation of the graphical representation such that the first structural primitives that are labeled as axes are aligning parallel to the coordinate axes of the image coordinate system.
13. The method of any of the previous items, the first basic graphical objects comprising line elements and characters.
14. The method of item 13, the geometric relations between the first basic graphical objects which are provided in form of line elements comprising angles and positions of the intersections of the respective line elements.
15. The method of any of items 13 or 14, the grouping of the first basic graphical objects comprising:
    grouping the first basic graphical objects which are provided in form of characters into strings comprising one or more of the characters.
16. The method of item 15, the method further comprising:
    extracting the first structural primitives which are provided in form of strings using an optical character recognition algorithm.
17. The method of item 16, the method further comprising:
    determining the parameters of the transformation of the extracted quantitative data values from the image coordinate system to the coordinate system of physical units using the strings provided by the first structural primitives that are labeled as tick values and determining for each of the respective strings coordinate values of one or more of the first structural primitives that are labeled as a tick and associated with the string, the coordinate values being provided in units of pixels according to the image coordinate system.
18. The method of any of items 16 or 17, the method further comprising:
    applying an error detection and correction algorithm using regression to the first structural primitives labeled as tick values which have been extracted using the optical character recognition algorithm.
19. The method of any of items 16 to 18, the method further comprising:
    storing for post-processing the extracted and transformed quantitative data values together with the first structural primitives which are extracted by the optical character recognition algorithm and which are assigned with first semantic labels that are identifying the respective first structural primitives as not representing quantitative data values.
20. The method of any of items 13 to 19, the graphical representation comprising markers representing the quantitative data values, the assigning of the first semantic labels comprising:
    labelling as a marker each of the first structural primitives which is provided by a single character located within the data region.
21. The method of any of the previous items, the quantitative data comprising a plurality of quantitative data series, the method further comprising:
    determining the individual data series by clustering the first structural primitives which are assigned with a first semantic label identifying the respective first structural primitives to represent the quantitative data using a clustering algorithm.
22. The method of item 21, the method further comprising:
    determining the number of individual data series which are comprised by the quantitative data using a legend provided by one or more of the first structural primitive which are labeled as legend or by determining the maximum number of the first structural primitive which are labeled as markers and assigned to a common one of the first structural primitives which is labeled as a tick of a vertical coordinate axis of the graphical representation.
23. The method of any of the previous items, the method further comprising:
    performing a quality check of the extraction procedure by generating a graphical representation of the extracted and transformed quantitative data values and comparing the generated graphical representation with the graphical representation of the digital image.
24. A computer program product comprising a computer-readable storage medium having computer-readable program code embodied therewith for automatically extracting data from a digital image providing a graphical representation of quantitative data, the computer-readable program code being configured to implement a method comprising:
    detecting first basic graphical objects forming the graphical representation;
    determining first structural primitives of the graphical representation, the determining of the first structural primitives comprising grouping the first basic graphical objects based on geometric relations between the first basic graphical objects;
    assigning a first semantic label to each of the first structural primitives;
    determining a spatial data region of the graphical representation using the first semantic labels of the first structural primitives;
    extracting quantitative data values which are represented by first structural primitives within the data region that are assigned with first semantic labels identifying the respective first structural primitives to represent quantitative data, the extracted quantitative data values being provided in units of pixels according to an image coordinate system;
    transforming the extracted quantitative data values from the image coordinate system to a coordinate system of physical units of the quantitative data represented by the graphical representation.
25. A computer system for automatically extracting data from a digital image providing a graphical representation of quantitative data, the computer system comprising a processor and a storage medium, the storage medium comprising program instructions being executable by the processor, execution of the program instructions by the processor causing the computer system to perform a method comprising:
    detecting first basic graphical objects forming the graphical representation;
    determining first structural primitives of the graphical representation, the determining of the first structural primitives comprising grouping the first basic graphical objects based on geometric relations between the first basic graphical objects;

assigning a first semantic label to each of the first structural primitives;

determining a spatial data region of the graphical representation using the first semantic labels of the first structural primitives;

extracting quantitative data values which are represented by first structural primitives within the data region that are assigned with first semantic labels identifying the respective first structural primitives to represent quantitative data, the extracted quantitative data values being provided in units of pixels according to an image coordinate system;

transforming the extracted quantitative data values from the image coordinate system to a coordinate system of physical units of the quantitative data represented by the graphical representation.

What is claimed is:

1. A computer-implemented method for automatically extracting data from a digital image comprising a graphical representation of quantitative data, the method comprising:
    detecting first basic graphical objects forming the graphical representation;
    determining first structural primitives of the graphical representation, the determining of the first structural primitives comprising grouping the first basic graphical objects based on geometric relations between the first basic graphical objects;
    assigning a first semantic label to each of the first structural primitives;
    determining a spatial data region of the graphical representation using the first semantic labels of the first structural primitives;
    extracting quantitative data values which are represented by a subset of the first structural primitives within the spatial data region that are assigned with the first semantic labels identifying respective first structural primitives to represent quantitative data; and
    transforming the extracted quantitative data values from an image coordinate system to a coordinate system of physical units of the quantitative data represented by the graphical representation.

2. The method of claim 1, wherein the assigning of the first semantic labels is performed using a probabilistic graphical model which performs the assigning of the first semantic labels in a statistical way.

3. The method of claim 2, further comprising using machine learning to train the probabilistic graphical model for assigning the first semantic labels.

4. The method of claim 3, wherein the machine learning comprises:
    providing a knowledge base for the probabilistic graphical model comprising a plurality of formulas defining potential rules for assigning semantic labels;
    providing the probabilistic graphical model with a training set of digital images with a known semantic structure;
    for each of the training images determining second structural primitives using second basic graphical objects detected in the training images and assigning second semantic labels to the second structural primitives by applying the formulas;
    assigning a weight to each of the formulas indicating the likelihood of the formula being true using a comparison of the assigned second semantic labels with the known semantic structure of the training images; and
    providing for the assigning of the first semantic labels the probabilistic graphical model with the knowledge base comprising the formulas which are assigned with the weights.

5. The method of claim 4, wherein when at least one of the second structural primitives remains unlabeled, the machine learning further comprises:
    identifying the unlabeled second structural primitive as undefined;
    adding at least one additional formula to the knowledge base, the at least one additional formula defining a potential rule for assigning a semantic label to the undefined second structural primitive; and
    repeating the assigning of the second semantic labels to the second structural primitives and the assigning of the weights to the formulas of the knowledge base taking into account the at least one additional formula.

6. The method of claim 1, wherein the assigning of the first semantic labels is performed using a set of fixed predefined rules.

7. The method of claim 1, wherein the determining of the first structural primitives and the assigning of the first semantic labels is performed iteratively.

8. The method of claim 1, wherein the determining of the spatial data region comprises identifying first structural primitives among the determined first structural primitives that are labeled as axes and determining the spatial region of the graphical representation that is framed by the axes as the data region.

9. The method of claim 1, further comprising, in preparation of the extracting of quantitative data values:
    identifying first structural primitives among the determined first structural primitives which are located within the spatial data region and which are assigned with the first semantic labels that are identifying respective first structural primitives as not representing quantitative data values; and
    removing the identified first structural primitives from the spatial data region.

10. The method of claim 9, wherein when the identified first structural primitives to be removed spatially overlaps with one or more of the first structural primitives which are assigned with the first semantic labels identifying the respective first structural primitives to represent the quantitative data, and the removing is performed using a mathematical morphology operation.

11. The method of claim 1, wherein the extracting of the quantitative data values comprises determining a geometric center of each of the first structural primitives which are assigned with the first semantic labels identifying the respective first structural primitives to represent the quantitative data and extracting coordinates of the geometric centers according to the image coordinate system.

12. The method of claim 1, further comprising, in preparation of the extracting of the quantitative data values, correcting an orientation of the graphical representation such that the first structural primitives that are labeled as axes are aligning parallel to the coordinate axes of the image coordinate system.

13. The method of claim 1, wherein the first basic graphical objects comprise line elements and characters.

14. The method of claim 13, wherein geometric relations between the first basic graphical objects are provided in a form of line elements comprising angles and positions of intersections of the respective line elements.

15. The method of claim 13, wherein the grouping of the first basic graphical objects comprises grouping the first basic graphical objects which are provided in a form of characters into strings comprising one or more of the characters.

16. The method of claim 15, further comprising extracting the first structural primitives which are provided in a form of strings using an optical character recognition algorithm.

17. The method of claim 16, further comprising determining parameters of the transformation of the extracted quantitative data values from the image coordinate system to the coordinate system of physical units using the strings provided by the first structural primitives that are labeled as tick values and determining for each of the respective strings coordinate values of one or more of the first structural primitives that are labeled as a tick and associated with the string, the coordinate values being provided in units of pixels according to the image coordinate system.

18. The method of claim 17, further comprising applying an error detection and correction algorithm using regression to the first structural primitives labeled as tick values which have been extracted using the optical character recognition algorithm.

19. The method of claim 16, further comprising storing for post-processing the extracted and transformed quantitative data values together with the first structural primitives which are extracted by the optical character recognition algorithm and which are assigned with first semantic labels that are identifying the respective first structural primitives as not representing quantitative data values.

20. The method of claim 13, wherein the graphical representation comprising markers represent the quantitative data values, and wherein the assigning of the first semantic labels comprises labelling as a marker each of the first structural primitives which is provided by a single character located within the data region.

21. The method of claim 1, wherein the quantitative data comprises a plurality of quantitative data series, the method further comprising determining the individual data series by clustering the first structural primitives which are assigned with a first semantic label identifying the respective first structural primitives to represent the quantitative data using a clustering algorithm.

22. The method of claim 21, further comprising determining a number of individual data series which are comprised by the quantitative data using a legend provided by one or more of the first structural primitive which are labeled as legend or by determining the maximum number of the first structural primitive which are labeled as markers and assigned to a common one of the first structural primitives which is labeled as a tick of a vertical coordinate axis of the graphical representation.

23. The method of claim 1, further comprising performing a quality check of the extraction procedure by generating a graphical representation of the extracted and transformed quantitative data values and comparing the generated graphical representation with the graphical representation of the digital image.

24. A computer program product comprising a non-transitory computer-readable storage medium having computer-readable program code embodied therewith for automatically extracting data from a digital image providing a graphical representation of quantitative data, the computer-readable program code being configured to implement a method comprising:
  detecting first basic graphical objects forming the graphical representation;
  determining first structural primitives of the graphical representation, the determining of the first structural primitives comprising grouping the first basic graphical objects based on geometric relations between the first basic graphical objects;
  assigning a first semantic label to each of the first structural primitives;
  determining a spatial data region of the graphical representation using the first semantic labels of the first structural primitives;
  extracting quantitative data values which are represented by a subset of the first structural primitives within the spatial data region that are assigned with the first semantic labels identifying respective first structural primitives to represent quantitative data; and
  transforming the extracted quantitative data values from an image coordinate system to a coordinate system of physical units of the quantitative data represented by the graphical representation.

25. A computer system for automatically extracting data from a digital image providing a graphical representation of quantitative data, the computer system comprising:
  at least one processor; and
  a storage medium coupled with the processor, the storage medium comprising program instructions being executable by the processor, execution of the program instructions by the processor causing the computer system to:
    detect first basic graphical objects forming the graphical representation;
    determine first structural primitives of the graphical representation, determining of the first structural primitives comprising grouping the first basic graphical objects based on geometric relations between the first basic graphical objects;
    assign a first semantic label to each of the first structural primitives;
    determine a spatial data region of the graphical representation using the first semantic labels of the first structural primitives;
    extract quantitative data values which are represented by a subset of the first structural primitives within the spatial data region that are assigned with the first semantic labels identifying respective first structural primitives to represent quantitative data; and
    transform the extracted quantitative data values from an image coordinate system to a coordinate system of physical units of the quantitative data represented by the graphical representation.

* * * * *